(12) United States Patent
M

(10) Patent No.: US 11,659,301 B1
(45) Date of Patent: May 23, 2023

(54) SYSTEM AND METHOD FOR INTEGRATION OF REAL TIME DATA WITH IMAGE FRAME FOR IMAGE STABILIZATION

(71) Applicant: E-CON SYSTEMS INDIA PRIVATE LIMITED, Chennai (IN)

(72) Inventor: Sandheep Kumar M, Chennai (IN)

(73) Assignee: E-CON SYSTEMS INDIA PRIVATE LIMITED

( * ) Notice: Subject to any disclaimer, the term of this patent is extended or adjusted under 35 U.S.C. 154(b) by 0 days.

(21) Appl. No.: 17/705,428

(22) Filed: Mar. 28, 2022

(51) Int. Cl.
*H04N 25/75* (2023.01)
*H04N 23/68* (2023.01)
*G06F 11/10* (2006.01)
*H04N 25/44* (2023.01)

(52) U.S. Cl.
CPC ......... *H04N 25/75* (2023.01); *G06F 11/1004* (2013.01); *H04N 23/684* (2023.01); *H04N 23/6812* (2023.01); *H04N 25/44* (2023.01)

(58) Field of Classification Search
CPC ......... H04N 23/68–6815; H04N 25/44; H04N 25/75; G06F 11/1004
See application file for complete search history.

(56) References Cited

U.S. PATENT DOCUMENTS 10,122,998 B2 11/2018 Van Baarsen et al.
2018/0041704 A1\* 2/2018 Jo ..................... H04N 23/6812
2021/0224556 A1 7/2021 Xu et al.

FOREIGN PATENT DOCUMENTS

DE 112019000049 T5 1/2020

OTHER PUBLICATIONS

Georges Gauthier & John Decusati, FPGA-Based Real-Time SLAM, Jan. 23, 2017.

\* cited by examiner

*Primary Examiner* — Lin Ye
*Assistant Examiner* — Chriss S Yoder, III
(74) *Attorney, Agent, or Firm* — Jason C. Cameron

(57) ABSTRACT

A system for integration of real-time data with image frame for image stabilization is disclosed. A host platform sends a first data request to an image sensor, sends a second data request to an electronic device. A semiconductor device including an input data receiving module to receive image data corresponding to the first data request via a mobile industry processor interface, receive auxiliary data corresponding to the second data request via an inter integrated circuit interface. A data synchronization module creates a predefined data packet of the image data, place the auxiliary data received in the real-time into an embedded data field, insert the embedded data field into the predefined data packet for sending to the host platform, receive instruction from the host platform to fetch the predefined data packet of the image data and retrieve the electronic device data from the embedded data field for recognizing the image stabilization.

15 Claims, 5 Drawing Sheets

SYSTEM AND METHOD FOR INTEGRATION OF REAL TIME DATA WITH IMAGE FRAME FOR IMAGE STABILIZATION

BACKGROUND

Embodiments of the present disclosure relate to a system for handling image stabilization and more particularly to a system and a method for integration of real-time data with image frame for image stabilization.

Image Stabilization is a method to reduce likelihood of taking blurry photos by moving camera lens automatically to compensate for camera movement which can be induced by the user hand-holding the camera, or because the camera is fixed on a platform prone to vibration or movements, like vehicles, helmets and the like. In general, there are three popular image stabilization techniques such as electronic image stabilization (EIS), optical image stabilization (OIS) and hybrid image stabilization (HIS). Various approaches are implemented to solve the image stabilization issues in real-time in different application areas such as military applications, video surveillance-based systems, medical applications, autonomous driving applications and the like.

Conventionally, several image stabilization approaches require real-time synchronized data with the image frame data for achieving better performance. For a non-real time, operating system like embedded Linux, implementing such precisely synchronized pipelines require a complex software logic that requires a lot of processing power. Also, the Linux operating system is a general-purpose operating system which lacks real-time processing functionalities. However, this can be attributed to its inherent scheduling latencies, which can't guarantee timely execution of the desired task. Moreover, such a conventional image stabilization approach to keep pipelines synchronized in real-time, utilizes a complex logic using implementation of mutexes and semaphores. Still, observations point to some latencies in terms of milliseconds which makes 'per-frame' processing irrelevant.

Hence, there is a need for an improved system and a method for integration of real-time data with image frame for image stabilization in order to address the aforementioned issues.

BRIEF DESCRIPTION

In accordance with an embodiment of the present disclosure, a system for integration of real-time data with image frame for image stabilization is disclosed. The system includes a host platform configured to send a first data request to an image sensor. The host platform is also configured to send a second data request to an electronic device, wherein the host platform communicates with a server via a communication network. The system also includes a semiconductor device operatively coupled to the host platform and the image sensor and electronic device. The semiconductor device is configured to execute and control bidirectional communications among a plurality of modules. The semiconductor device includes an input data receiving module configured to receive image data corresponding to the first data request from the image sensor via a mobile industry processor interface. The input data receiving module is also configured to receive auxiliary data corresponding to the second data request from the electronic device in real-time via an inter integrated circuit interface. The semiconductor device also includes a data synchronization module configured to create a predefined data packet of the image data received from the image sensor. The data synchronization module is also configured to place the auxiliary data received in the real-time into an embedded data field. The data synchronization module is also configured to insert the embedded data field into the predefined data packet for sending to the host platform. The data synchronization module is also configured to receive an instruction from the host platform to fetch the predefined data packet of the image data and retrieve the electronic device data from the embedded data field for recognizing the image stabilization. The data synchronization module is programmed and controlled by the host platform. As soon as the data synchronization module is enabled and frames comes in from the image sensor, the output is available from it. It is up to the host platform to receive and decode the data.

In accordance with another embodiment of the present disclosure, a method for integration of real-time data with image frame for image stabilization is disclosed. The method includes sending, by a host platform, a first data request to an image sensor. The method also includes sending, by the host platform, a second data request to an electronic device. The method also includes receiving, by an input data receiving module of a semiconductor device, image data corresponding to the first data request from the image sensor via a mobile industry processor interface. The method also includes receiving, by the input data receiving module of the semiconductor device, auxiliary data corresponding to the second data request from the electronic device in real-time via an inter integrated circuit interface. The method also includes creating, by a data synchronization module of the semiconductor device, a predefined data packet of the image data received from the image sensor. The method also includes placing, by the data synchronization module of the semiconductor device, the auxiliary data received in the real-time into an embedded data field. The method also includes inserting, by the data synchronization module of the semiconductor device, the embedded data field into the predefined data packet for sending to the host platform. The method also includes receiving, by the data synchronization module of the semiconductor device, an instruction from the host platform to fetch the predefined data packet of the image data and retrieve the electronic device data from the embedded data field for recognizing the image stabilization.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
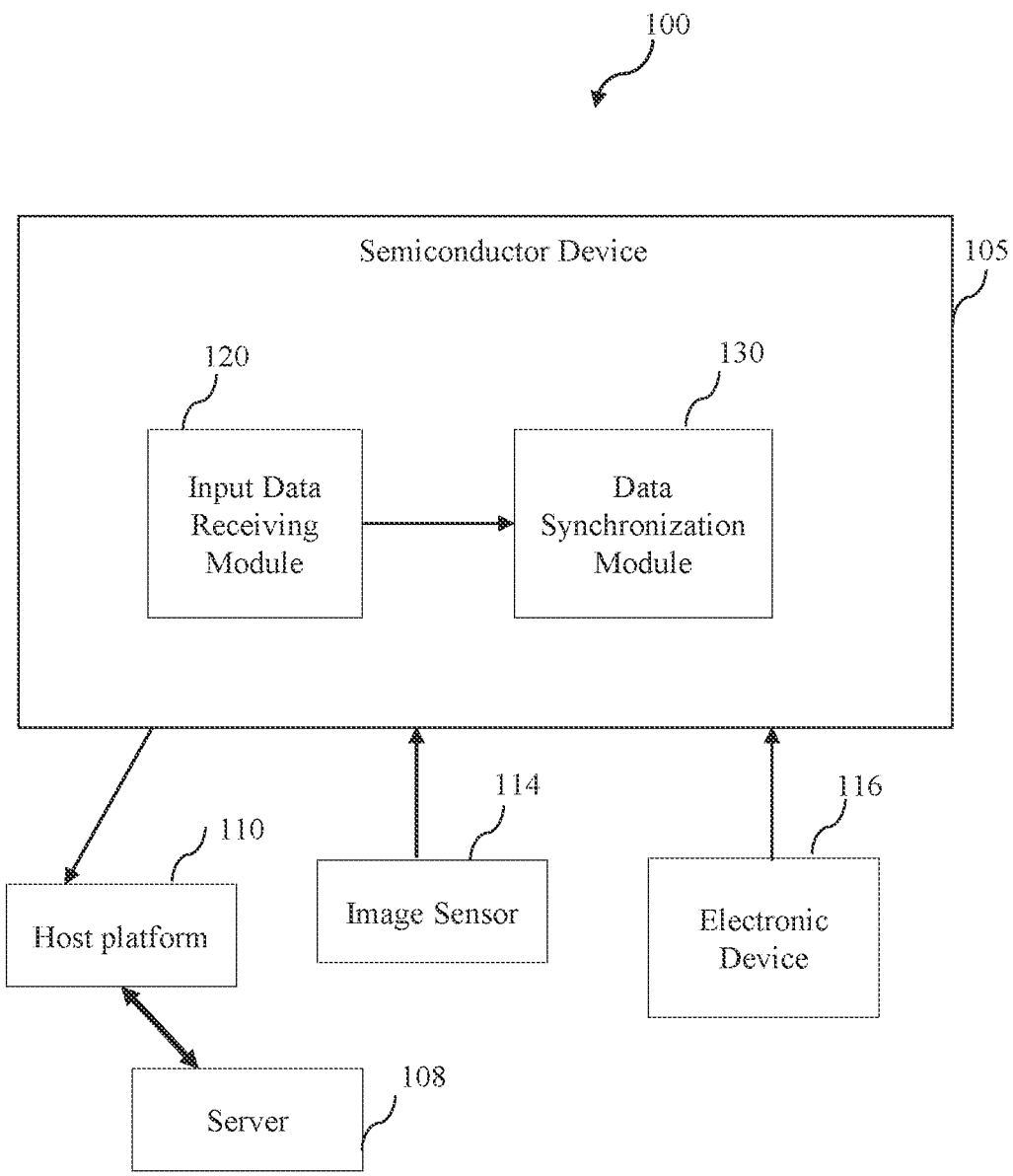
FIG. 1 is a block diagram of a system for integration of real-time data with image frame for image stabilization in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will he used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for integration of real-time data with image frame for image stabilization. The system includes a host platform configured to send a first data request to an image sensor. The host platform is also configured to send a second data request to an electronic device, wherein the host platform communicates with a server via a communication network. The system also includes a semiconductor device operatively coupled to the host platform and the image sensor and electronic device. The semiconductor device is configured to execute and control bidirectional communications among a plurality of modules. The semiconductor device includes an input data receiving module configured to receive image data corresponding to the first data request from the image sensor via a mobile industry processor interface. The input data receiving module is also configured to receive auxiliary data corresponding to the second data request from the electronic device in real-time via an inter integrated circuit interface. The semiconductor device also includes a data synchronization module configured to create a predefined data packet of the image data received from the image sensor. The data synchronization module is also configured to place the auxiliary data received in the real-time into an embedded data field. The data synchronization module is also configured to insert the embedded data field into the predefined data packet for sending to the host platform. The data synchronization module is also configured to receive an instruction from the host platform to fetch the predefined data packet of the image data and retrieve the electronic device data from the embedded data field for recognizing the image stabilization.

FIG. 1 is a block diagram of a system 100 for integration of real-time data with image frame for image stabilization in accordance with an embodiment of the present disclosure. The system 100 includes a host platform 110 configured to send a first data request to an image sensor. The host platform 110 is also configured to send a second data request to an electronic device, wherein the host platform 110 communicates with a server 108 via a communication network. In one embodiment, the server 108 may include a cloud server. In another embodiment, the server 108 may include a local server. The semiconductor device 105 is configured to execute on a network (not shown in FIG. 1) to control bidirectional communications among a plurality of modules. In one embodiment, the network may include a wireless communication network such as wi-fi, Bluetooth, Zigbee, near field communication (NFC), infra-red communication (RFID) or the like. In a specific embodiment, the host platform may configure the number of desired image sensors. The host platform performs the configuration of image sensor and electronic device or auxiliary sensor only once during initialization phase. Once configured, the image sensor starts providing the frames. The FPGA has the ability to automatically detect the incoming frames. Once it detects, it sends a request to IMU to read the data.

In one embodiment, the host platform 110 may include a Tegra Jetson NX SOM processor. In some embodiment, the image sensor may include a charged coupled device (CCD) sensor or a complementary metal oxide sensor (CMOS). In another embodiment, the electronic device may include an auxiliary sensor such as an inertial measurement unit (IMU) sensor. The image sensor is interfaced with the host platform or the processor via a mobile industry processor interface (MIPI). In addition, there is a control interface based on inter integrated circuit (12C), which is used to program the image sensor and the electronic device (IMU). Other interfaces include, but not limited to, serial peripheral interface (SPI), simple electrical signalling interface and the like.

The system 100 also includes a semiconductor device 105 operatively coupled to the host platform 110 and the image sensor 114 and electronic device 116. The host platform 110 is connected to the semiconductor device via flexible flat cables (FFC) or IPEX cables.

The semiconductor device 105 includes an input data receiving module 120 configured to receive image data corresponding to the first data request from the image sensor via a mobile industry processor interface. The input data receiving module 120 is also configured to receive auxiliary data corresponding to the second data request from the electronic device in real-time via an inter integrated circuit interface, In one embodiment, the first data request is representative of petition for reading image data from the image sensor. In another embodiment, the second data request is representative of petition for reading inertial measurement unit data from the inertial measurement unit sensor.

The semiconductor device 105 also includes a data synchronization module 130 configured to create a predefined data packet of the image data received from the image sensor. The data synchronization module 130 is also configured to place the auxiliary data received in the real-time into an embedded data field. In some embodiment, the semiconductor device comprises a field programmable gate array (FPGA), As used herein, the term FPGA is defined as a semiconductor device that is based around a matrix of configurable logic blocks (CLBs) connected via programmable interconnects. In a specific embodiment, the predefined data packet of the image data may include a mobile industry processor interface (MIPI) data packet. In some embodiment the predefined data packet may include a long data packet or a short data packet. In such embodiment, the long data packet may include a 32-bit packet header, an application specific data payload with a variable number of 8-bit data words and a 16-bit packet footer. In such embodiment, the packet header comprises an eight-bit data identifier, a sixteen-bit word count field and an eight-bit error connection code. In one embodiment, the packet footer may include a sixteen-bit checksum element. In another embodiment, the short data packet may include a packet header. A packet footer is not present in the short data packet. The word count field in the packet header is replaced by a short packet data field. The short data packet is primarily used for line synchronization and frame synchronization purposes.

The data synchronization module 130 is also configured to insert the embedded data field into the predefined data packet for sending to the host platform. The data synchronization module 130 is also configured to receive an instruction from the host platform to fetch the predefined data packet of the image data and retrieve the electronic device data from the embedded data field for recognizing the image stabilization. The data synchronization module is programmed and controlled by the host platform. As soon as the data synchronization module is enabled and frames comes in from the image sensor, the output is available from it. It is up to the host platform to receive and decode the data.

Figure 2:
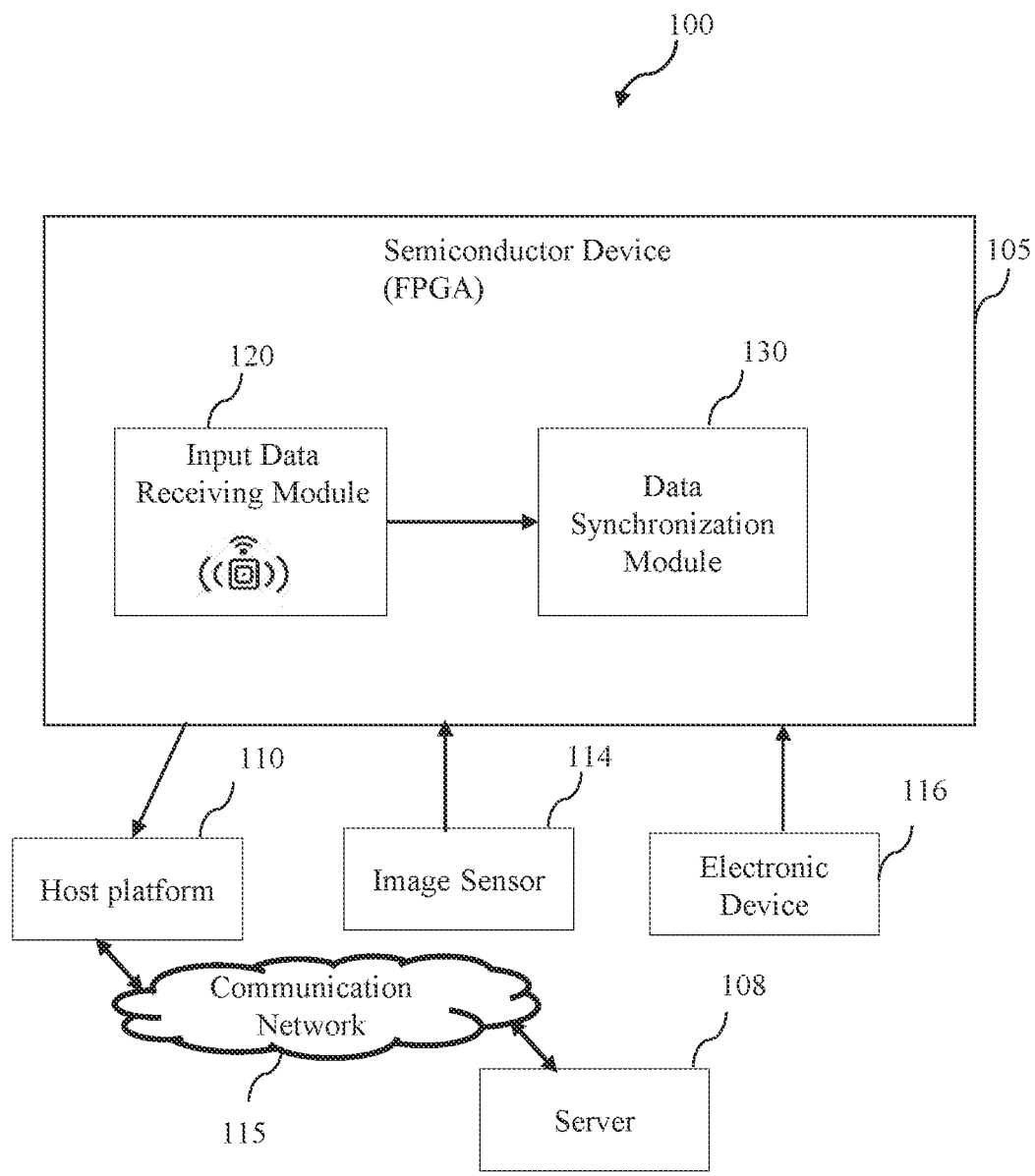
FIG. 2 illustrates a schematic representation of an exemplary embodiment of a system for integration of real-time data with image frame for image stabilization of FIG. 1 in accordance with an embodiment of the present disclosure.

FIG. 2 illustrates a schematic representation of an exemplary embodiment of a system for integration of real-time data with image frame for image stabilization of FIG. 1 in accordance with an embodiment of the present disclosure. Considering an example, where the system is utilized in field of image stabilization. In such a scenario, various image stabilization technique requires real-time synchronized electronic device data and image frame data for achieving better performance. For a non-real time, operating system like embedded Linux, implementing such precisely synchronized pipelines require a complex software logic that requires a lot of processing power. As a result, the system (100) is utilized to reduce the processor overhead and achieve synchronization, embeds real-time IMU data in the camera frame and send it to a host platform.

The system 100 includes the host platform 110 which communicates with a web application running in background. In the example used herein, the host platform 110 sends a first data request to an image sensor 114. Also, the host platform 110 is configured to send a second data request to an electronic device 116, wherein the host platform 110 communicates with a server 108 via a communication network. In the example used herein, the server 108 may include a cloud server. The semiconductor device 105 is configured to execute on a network 115 to control bidirectional communications among a plurality of modules. In one example, the network may include a wireless communication network such as wi-fi, Bluetooth, Zigbee, near field communication (NFC), infra-red communication (RFID) or the like.

For example, the host platform 110 may include a Tegra Jetson NX SOM processor. In the example used herein, the image sensor may include a charged coupled device (CCD) sensor or a complementary metal oxide sensor (CMOS). Again, the electronic device may include an inertial measurement unit (IMU) sensor. The image sensor is interfaced with the host platform or the processor via a mobile industry processor interface (MIPI). In addition, there is a control interface based on inter integrated circuit (I2C), which is used to program the image sensor and the electronic device (IMU). Other interfaces include, but not limited to, serial peripheral interface (SPI), simple electrical signalling interface and the like.

The system 100 also includes a semiconductor device 105. The semiconductor device 105 is configured to execute and control bidirectional communications among a plurality of modules. The host platform 110 is connected to the semiconductor device via FFC/IPEX cables. Here, the semiconductor device is a field programmable gate array (FPGA) that is based around a matrix of configurable logic blocks (CLBs) connected via programmable interconnects. The semiconductor device 105 includes an input data receiving module 120 to receive image data corresponding to the first data request from the image sensor via a mobile industry processor interface (MIPI). For example, the first data request is representative of petition for reading image data from the image sensor. Also, the input data receiving module 120 is configured to receive auxiliary data corresponding to the second data request from the electronic device in real-time via an inter integrated circuit interface (I2C) interface. In the example used herein, the second data request is representative of petition for reading inertial measurement unit data from the inertial measurement unit (IMU) sensor.

Once the electronic device data and the image data is read and received via the MIPI interface and the I2C interface in the example used herein, a data synchronization module 130 of the semiconductor device 105, creates a predefined data packet of the image data received from the image sensor. The data synchronization module 130 is also configured to place the auxiliary data received in the real-time into an embedded data field. For example, the predefined data packet of the image data may include a mobile industry processor interface (MIPI) data packet. In such an example, the predefined data packet may include a long data packet or a short data packet. For example, the long data packet may include a 32-bit packet header, an application specific data payload with a variable number of 8-bit data words and a 16-bit packet footer. Again, the packet header includes an eight-bit data identifier, a sixteen-bit word count field and an eight-bit error connection code. Similarly, the packet footer may include a sixteen-bit checksum element.

Again, the short data packet may include a packet header. A packet footer is not present in the short data packet. The word count field in the packet header is replaced by a short packet data field. The short data packet is primarily used for line synchronization and frame synchronization purposes. In a generic MIPI Data frame, along with short packets there are N long packets normally between Frame start and Frame End, where N is the number of lines in a frame. It is possible to add long packets containing metadata information, to the beginning and to the end of each frame. If embedded information exists, then the long packets containing the embedded data must use the embedded data code (0x12) in the data identifier field. There may be zero or more lines of embedded data at the start of the frame or end of the frame or both start and end. These lines are termed the frame header and frame footer. In example used herein, the frame header for embedded meta data line is added to start of every frame that comes from the sensor output. The FPGA places an embedded data line using its identifier field and modifies first 24 bytes of the embedded data with the IMU data. The 24 bytes of the IMU data contains the x-axis, y-axis, z-axis values of the accelerometer, gyroscope and magnetometer.

Furthermore, the data synchronization module 130 is also configured to insert the embedded data field into the predefined data packet for sending to the host platform 105. The data synchronization module 130 is also configured to receive an instruction from the host platform to fetch the predefined data packet of the image data and retrieve the electronic device data from the embedded data field for recognizing the image stabilization. The data synchronization module is programmed and controlled by the host platform. As soon as the data synchronization module is enabled and frames comes in from the image sensor, the output is available from it. It is up to the host platform to receive and decode the data.

Figure 3:
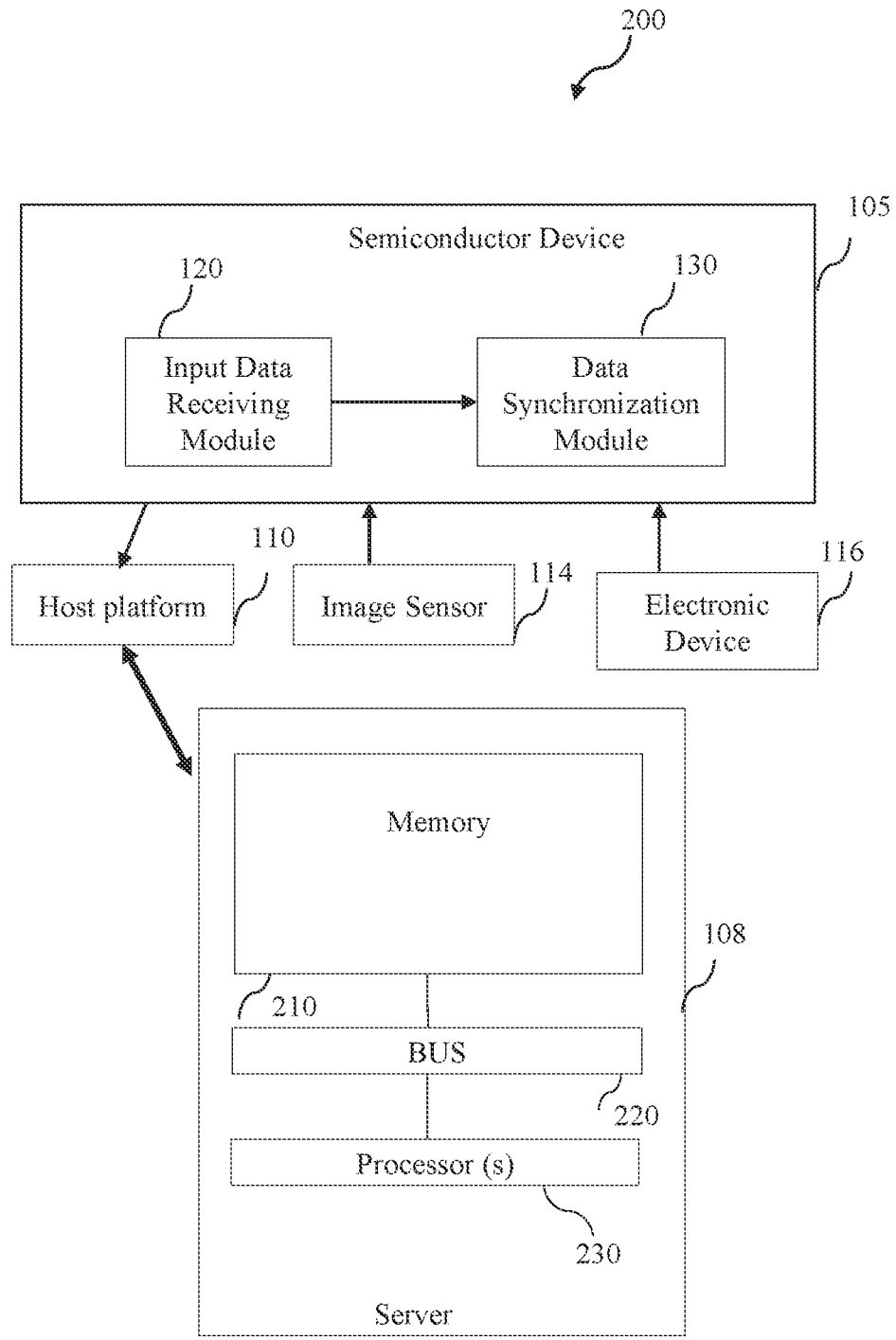
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, an integrated chipset or a combination thereof.

The memory 210 includes several subsystems stored in the form of executable program which instructs the processor 230 to perform the method steps illustrated in FIG. 1. The bus 220 as used herein refers to be internal memory channels or computer network that is used to connect computer components and transfer data between them. The bus 220 includes a serial bus or a parallel bus, wherein the serial bus sends data in bit-serial format and the parallel bus sends data across multiple wires. The bus 220 as used herein, may include but not limited to, a system bus, an internal bus, an external bus, an expansion bus, a frontside bus, a backside bus and the like.

Further, the server 200 communicates with the host platform 110 via a wireless communication network. Again, the host platform is connected with the semiconductor device (FPGA) 105 via FTC or IPEX cables. The semiconductor device 105 includes an input data receiving module 120 configured to receive image data corresponding to the first data request from the image sensor via a mobile industry processor interface. The input data receiving module 120 is also configured to receive auxiliary data corresponding to the second data request from the electronic device in real-time via an inter integrated circuit interface. The semiconductor device 105 also includes a data synchronization module 130 configured to create a predefined data packet of the image data received from the image sensor. The data synchronization module 130 is also configured to place the auxiliary data received in the real-time into an embedded data field. The data synchronization module 130 is also configured to insert the embedded data field into the predefined data packet for sending to the host platform. The data synchronization module 130 is also configured to receive an instruction from the host platform to fetch the predefined data packet of the image data and retrieve the electronic device data from the embedded data field for recognizing the image stabilization.

Figure 4A:
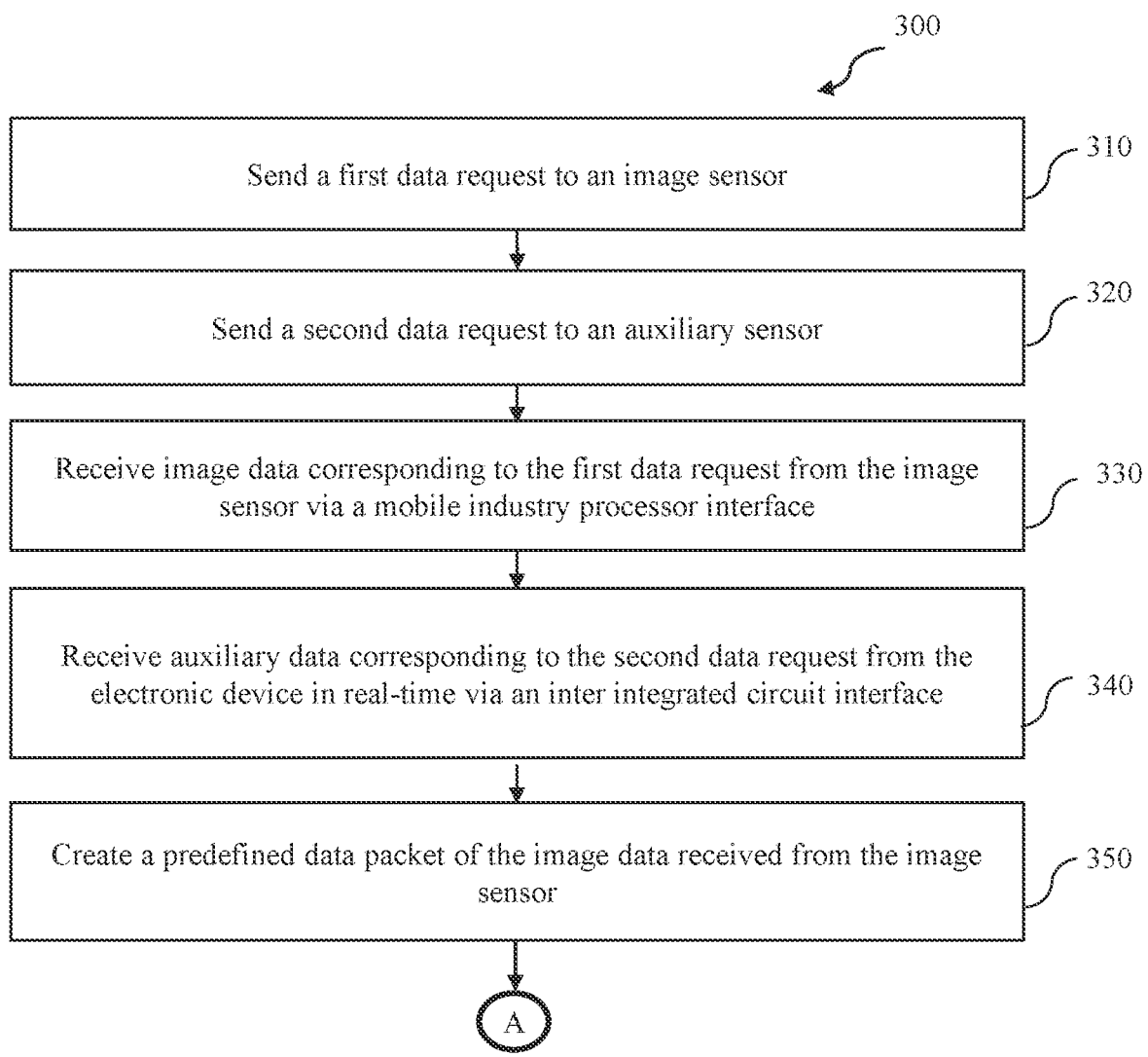
FIG. 4(a) is a flow chart representing the steps involved in a method for integration of real-time data with image frame for image stabilization in accordance with the embodiment of the present disclosure.
Figure 4B:
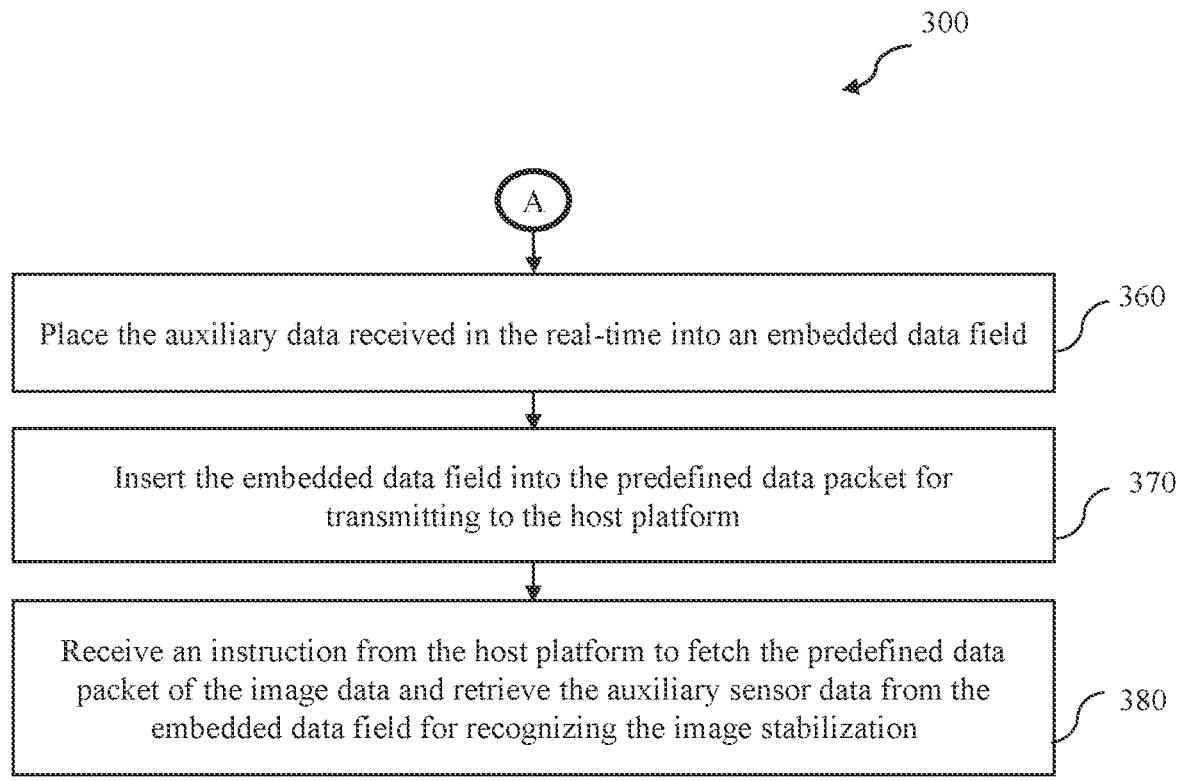
FIG. 4(b) is a flow chart representing the continued steps of method for integration of real-time data with image frame for image stabilization of FIG. 4(a) in accordance with the embodiment of the present disclosure.

FIG. 4(a) is a flow chart representing the steps involved in a method 300 for integration of real-time data with image frame for image stabilization in accordance with the embodiment of the present disclosure. FIG. 4(b) is a flow chart representing the continued steps of method for integration of real-time data with image frame for image stabilization of FIG. 4(a) in accordance with the embodiment of the present disclosure. The method 300 includes sending, by a host platform, a first data request to an image sensor in step 310. In one embodiment, sending the first data request to the image sensor may include sending the first data request to a charged coupled device (CCD) sensor or a complementary metal oxide sensor (CMOS).

The method 300 also includes sending, by the host platform, a second data request to an electronic device in step 320. In one embodiment, sending the second data request to the electronic device may include sending the second data request to an inertial measurement unit (IMU) sensor. In such embodiment, the second data request is representative of petition for reading inertial measurement unit data from the inertial measurement unit sensor.

The method 300 also includes receiving, by an input data receiving module of a semiconductor device, image data corresponding to the first data request from the image sensor via a mobile industry processor interface in step 330. The method 300 also includes receiving, by the input data receiving module of the semiconductor device, auxiliary data corresponding to the second data request from the electronic device in real-time via an inter integrated circuit interface in step 340.

The method 300 also includes creating, by a data synchronization module of the semiconductor device, a predefined data packet of the image data received from the image sensor in step 350. In some embodiment, the semiconductor device may include a field programmable gate array (FPGA). In some embodiment, creating the predefined data packet of the image data received from the image sensor may include creating a mobile industry processor interface (MIPI) data packet. In such embodiment, creating the predefined data packet may include creating the predefined data packet including a long data packet or a short data packet. In such embodiment, the long data packet may include a 32-bit packet header, an application specific data payload with a variable number of 8-bit data words and a 16-bit packet footer. In such embodiment, the packet header comprises an eight-bit data identifier, a sixteen-bit word count field and an eight-bit error connection code. In one embodiment, the packet footer may include a sixteen-bit checksum element. In another embodiment, creating the predefined data packet may include creating the short data packet including a packet header.

The method 300 also includes placing, by the data synchronization module of the semiconductor device, the auxiliary data received in the real-time into an embedded data field in step 360. The method 300 also includes inserting, by the data synchronization module of the semiconductor device, the embedded data field into the predefined data packet for sending to the host platform in step 370. The method 300 also includes receiving, by the data synchronization module of the semiconductor device, an instruction from the host platform to fetch the predefined data packet of the image data and retrieve the electronic device data from the embedded data field for recognizing the image stabilization in step 380.

Various embodiments of the present disclosure provide a system to integrate real time data with image frame by solving the problem of synchronization between the real-time data frame and image frame and reduces the processing power requirement in order to achieve better performance.

Moreover, the present disclosed system reduces requirement of keeping image sensor and electronic device pipelines synchronized in real-time. Also, requirement of implementation of a complex logic using mutexes and semaphores is avoided and thereby helps in overcoming some latencies in terms of milliseconds which makes 'per-frame' processing relevant.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for integration of real e data with image frame for image stabilization comprising:
a host platform configured to:
send a first data request to an image sensor; and
send a second data request to an electronic device;
a semiconductor device operatively coupled to the host platform and the image sensor and electronic device, wherein the semiconductor device is configured to execute and control bidirectional communications among a plurality of modules comprising:
an input data receiving module configured to:
receive image data corresponding to the first data request from the image sensor via a mobile industry processor interface; and
receive auxiliary data corresponding to the second data request from the electronic device in real-time via an inter integrated circuit interface; and
a data synchronization module communicatively coupled to the input data receiving module, wherein the data synchronization module is configured to:
create a predefined data packet of the image data received from the image sensor;
place the auxiliary data received in the real-time into an embedded data. field;
insert the embedded data field into the predefined data packet for sending to the host platform; and
receive an instruction from the host platform to fetch the predefined data packet of the image data and retrieve the electronic device data from the embedded data field for recognizing the image stabilization.

2. The system of claim 1, wherein the host platform comprises a Tegra Jetson NX SOM processor.

3. The system of claim 1, wherein the image sensor comprises a charged coupled device sensor or a complementary metal oxide sensor.

4. The system of claim 1, wherein the electronic device comprises an inertial measurement unit sensor.

5. The system of claim 4, wherein the second data request is representative of reading inertial measurement unit data from the inertial measurement unit sensor.

6. The system of claim 1, wherein the first data request is representative of reading image data from the image sensor.

7. The system of claim 1, wherein the semiconductor device comprises a field programmable gate array.

8. The system of claim 1, wherein the inter integrated circuit interface is configured to program the image sensor and the electronic device respectively.

9. The system of claim 1, wherein the predefined data packet of the image data comprises a mobile industry processor interface data packet.

10. The system of claim 1, wherein the predefined data packet comprises a long data packet or a short data packet.

11. The system of claim 10, wherein the long data packet comprises a 32-bit packet header, an application specific data payload with a variable number of 8-bit data words and a 16-bit packet footer.

12. The system of claim 11, wherein the packet header comprises an eight-bit data identifier, a sixteen-bit word count field and an eight-hit error connection code.

13. The system of claim 11, wherein the packet footer sixteen-bit checksum element.

14. The system of claim 10, wherein the short data packet comprises a packet header.

15. A method comprising:
sending, by a host platform, a first data request to an image sensor;
sending, by the host platform, a second data request to an electronic device;
receiving, by an input data receiving module of a semiconductor device, image data corresponding to the first data request from the image sensor via a mobile industry processor interface;
receiving, by the input data receiving module of the semiconductor device, auxiliary data corresponding to the second data request from the electronic device in real-time via an inter integrated circuit interface;
creating, by a data synchronization module of the semiconductor device, a predefined data packet of the image data received from the image sensor;
placing, by the data synchronization module of the semiconductor device, the auxiliary data received in the real-time into an embedded data field;
inserting, by the data synchronization module of the semiconductor device, the embedded data field into the predefined data packet for sending to the host platform; and receiving, by the data synchronization module of the semiconductor device, an instruction from the host platform to fetch the predefined data packet of the image data and retrieve the electronic device data from the embedded data field for recognizing the image stabilization.

* * * * *